United States Patent [19]

Hughes et al.

[11] 3,979,723

[45] Sept. 7, 1976

[54] DIGITAL DATA COMMUNICATION NETWORK AND CONTROL SYSTEM THEREFOR

[75] Inventors: David Robert Hughes; Alexander Polischuk-Sawtschenko, both of Raleigh, N.C.

[73] Assignee: International Business Machines Corporation, Armonk, N.Y.

[22] Filed: Oct. 29, 1975

[21] Appl. No.: 626,802

[52] U.S. Cl. .......................... 340/147 R; 178/58 A; 179/15 AL
[51] Int. Cl.² ..................... H04Q 9/00; H04L 5/14; H04J 3/06; H04L 5/16
[58] Field of Search ............. 340/147 R; 178/4.1 R, 178/68, 58 A; 179/15 AL

[56] References Cited
UNITED STATES PATENTS

| | | |
|---|---|---|
| 3,245,038 | 4/1966 | Stafford et al. ................ 340/147 R |
| 3,405,393 | 10/1968 | Haselwood ...................... 340/172.5 |
| 3,564,145 | 2/1971 | Deutsch .......................... 179/15 AL |
| 3,715,725 | 2/1973 | Kievit et al. ..................... 340/147 R |
| 3,752,932 | 8/1973 | Frisom ............................ 179/15 AL |
| 3,755,786 | 8/1973 | Dixon et al. ................. 179/15 AL X |
| 3,904,829 | 9/1975 | Martin et al. .................... 179/15 AL |
| 3,906,153 | 9/1975 | Polischuk-Sawtschenko 179/15 AL X |

*Primary Examiner*—Donald J. Yusko
*Attorney, Agent, or Firm*—John B. Frisone

[57] ABSTRACT

A digital data communication network in which half-duplex communications are established between a central station and a plurality of remote terminal devices under control of the central station and in which said remote terminal devices are grouped and each group is serially connected and receives data signals in parallel over a simplex link from the central station and in which one group of serially connected stations is selectively connected to a second simplex link for transmitting, in a predetermined sequence, data signals to the central station.

6 Claims, 3 Drawing Figures

DIGITAL DATA COMMUNICATION NETWORK AND CONTROL SYSTEM THEREFOR

FIELD OF THE INVENTION

The invention relates to data communications in general and more particularly to data communication networks and controls therefor.

DESCRIPTION OF THE PRIOR ART

Networks for the communication of digital data between a central facility and a plurality of remote terminal devices are well known and may take many forms. A more common form is the multi-point network operating in either half-duplex or full duplex mode. In its most common forms half-duplex multi-point network typically includes a central station connected to a single physical communication channel and a plurality of terminals connected in parallel to this same physical channel. Alternatively, two separate channels may be used in a mutually exclusive manner. Communications on these networks may be either in the form of contention communications in which devices listen and if they do not hear any activity on the network, transmit or preferably under control of the central station. The control may take many forms. Typically, however, the central station will send messages preceded by addresses to specific terminals or groups of terminals connected to the communication facility and will authorize or poll specific terminals providing them with an opportunity to transmit messages to the central station. The specific signalling arrangements again may take many forms, and it would be impossible to describe the vast multitude in this specification. This type of network has a substantial number of drawbacks, the most important of which is the turnaround time required. When communication changes direction with a single line, the line must quiesce and the terminal or device initiating communications must transmit synchronizing sequences to permit the decoding and detection of the data signals transmitted. If two lines are utilized, the time required to quiesce the transmit line is eliminated. In environments where short messages are transmitted, the turnaround time for either system can become a significant percentage of the total channel capacity which is not utilized.

A full duplex multipoint network utilizes one facility for carrying messages from the central station to the terminals. The addressing techniques are identical to those described above and a second facility is provided for simultaneously conducting messages from the devices to the central station. In this environment, polling messages are sent to the terminals from the central station over the outbound channel and the stations are started up and communicate their messages over the inbound channel to the central station. Here again as in the prior case, the inbound line must be synchronized between transmission from terminals connected thereto.

A modification of the full duplex multipoint system described above is shown in U.S. Pat. No. 3,245,038. This modification permits a substantial improvement in the utilization of the communication facilities. In the patent, a number of concentrators are connected in parallel to a full duplex multipoint network. Polling signals are sent by the central station to the most remote concentrator on the full duplex link. This concentrator transmits its data over the inbound channel and then passes the poll to the next most remote concentrator. The process continues until the nearest concentrator notifies the central station that it has completed transmission. Each of the concentrators is connected to a number of terminal devices. The concentrators scan the lines to these devices and assemble messages from the devices in buffers located within the concentrator. When the buffers are filled, they are assembled and transmitted to the central station whenever the concentrator is polled. The major drawback of this system is the complexity and cost of the concentrator. It requires large amounts of buffering and hardware for scanning the terminals and storing the messages and reformatting the stored messages from each of the terminals into a transmission block suitable for transmission to the central station.

A more recent development utilizes a serial loop network. In this network, the central station is provided with a transmitter and a receiver. The transmitter is connected to the first of a plurality of serially connected terminals and the last of the serially connected terminals is connected to the receiver of the central station. Polling signals and messages may be transmitted at the central station. When a polling signal is received at one of the terminal stations, it interrupts the data following the polling signal and inserts its message on the loop, thereafter transmitting a polling signal which permits terminals further down the loop to transmit messages back to the central. This arrangement is particularly advantageous since the turnaround time mentioned above is reduced to zero.

British Patent 1,250,352, published Oct. 20, 1971, describes a serial loop communications network. In this network, all of the terminal devices are connected in a long serial loop. Signals are modulated at the central station and sent over long distance lines to remote locations where demodulation of these signals takes place. The demodulated signals are passed through locally serially connected terminals and then returned to a modulator which transmits the serial signals to another demodulator where the process is repeated. Thus, a limited number of modulators and demodulators may service a larger number of terminal devices. However, the modulators, demodulators and terminals are connected in a single long series loop. While this system does not suffer from the inefficiencies introduced by turnaround time, it is, nevertheless, prone to total disruption when any terminal device or other component fails since the integrity of the loop is destroyed and communications thereover can no longer proceed until the fault is rectified.

The network illustrated in U.S. Pat. No. 3,245,038 does not suffer from such a drawback since a failure at one of the terminal devices connected to the concentrators will have no effect on the communications capability of the other devices. In addition, the failure in one of the modulators or demodulators associated with the concentrators will only affect the terminals connected to that concentrator. The remaining portions of the network will remain operative.

U.S. Pat. No. 3,752,932 has a network distribution similar to that of British Patent 1,250,352; however, it employs a different control concept for the network. It also, when used over long distances on leased public carrier communications lines, is prone to network failure when a fault or malfunction occurs at any device.

A digital data network similar to that described in the application is described in patent application Ser. No.

541,541, filed Jan. 16, 1975, and assigned to the same assignee as this application. While the physical networks are similar, they differ in operation. The above referenced patent application discloses a full duplex link between the central station and the remote serially connected groups of terminals in which the interface units are required to provide a control function when data is transmitted to the central station. This application describes a half duplex arrangement using dual communications links by which all control functions are performed by the central station. This change provides several advantages. In the first place, the central station never relinquishes control over the communications link. Secondly, the control functions required in the multiple interface units are substantially simplified, thus reducing the complexity of multiple units. These advantages do, however, result in a reduction of thruput or lower utilization of band width. However, in many instances these disadvantages are not significant since the less efficient use of the available band width can be traded for reduced complexity.

SUMMARY OF THE INVENTION

The invention contemplates a communications network and control for providing bidirectional data communication between a central control station and a plurality of remote terminal stations comprising: input and output means at said central station, a first communication channel connected to said central station output means for receiving and conveying digital data signals therefrom, a second communication channel connected to said central station input means for conveying digital data signals thereto, a plurality of interface units each having an input means connected to the said first communication channel and an output means connected to said second communication channel, a plurality of terminals each having data signal inputs and outputs connected in series, first control means connecting the interface input means to the input of the first of the series connected terminals, second control means connecting the interface output means to the output of the last terminal of the series connected terminals, said first control means responsive to unique control signals for establishing a connection via the said second control means between the output of the last series connected terminal and the second communication channel and for providing line control signals to the input of the first series connected terminal for enabling said terminals to transmit digital data signals in sequence.

DESCRIPTION OF THE PREFERRED EMBODIMENTS

Figure 1:
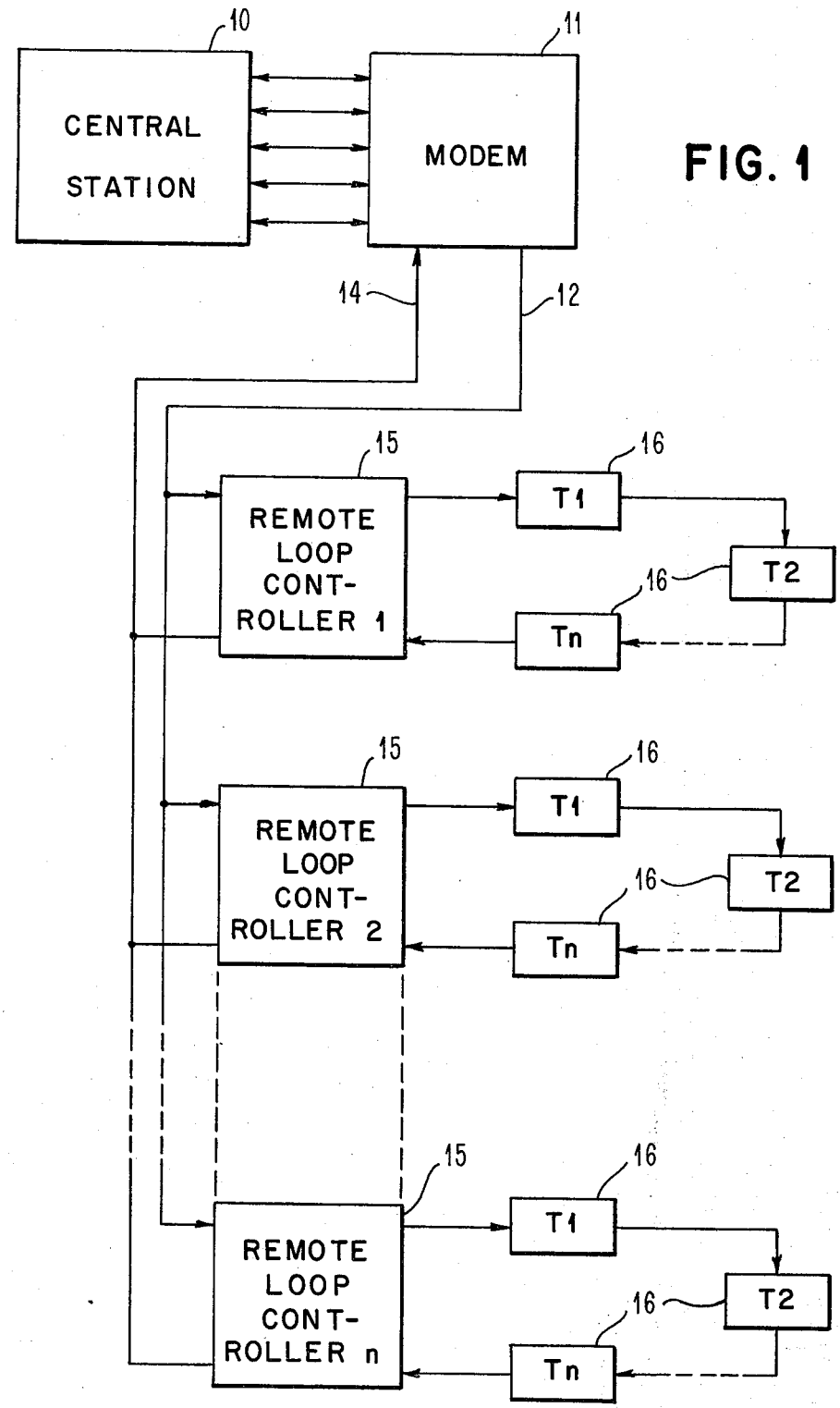
FIG. 1 is a block diagram of a communications network constructed according to the invention.

The network shown in FIG. 1 is suitable as a data communication network in many applications. For example, it could be used to connect a central computerized accounting facility of a multi-branched bank via leased communication lines to the various branches which are geographically separated. At each of the geographically separated banks, a plurality of teller terminals and accounting terminals could be connected via private wire through the interface unit to the leased communication lines.

The central station 10 is connected by a modem 11 and two simplex communication lines 12 and 14 to a plurality of remote loop controllers 15. Each controller 15 is connected to a plurality of serially connected terminals 16. The number of terminals connected to each controller 15 depends on the size and requirements of the particular location and as a practical matter, may vary over a wide range. The central station 10 may typically include an IBM 3705 Communications Controller and an IBM System 370 Computer. An IBM 3872 Modem may be selected for the modem model 11. A similar modem is required at each of the units 15.

Each of the units 15 is provided with a unique address. In addition, each of the terminals 16 is also provided with a unique address. The particular format which the address may take is not significant. However, the bit patterns used for encoding the addresses must be unique for each of the devices so that they may be distinguished one from another by a particular device. The components used for implementing the operation being described now are described below in connection with the description of the remaining figures.

Figure 2:
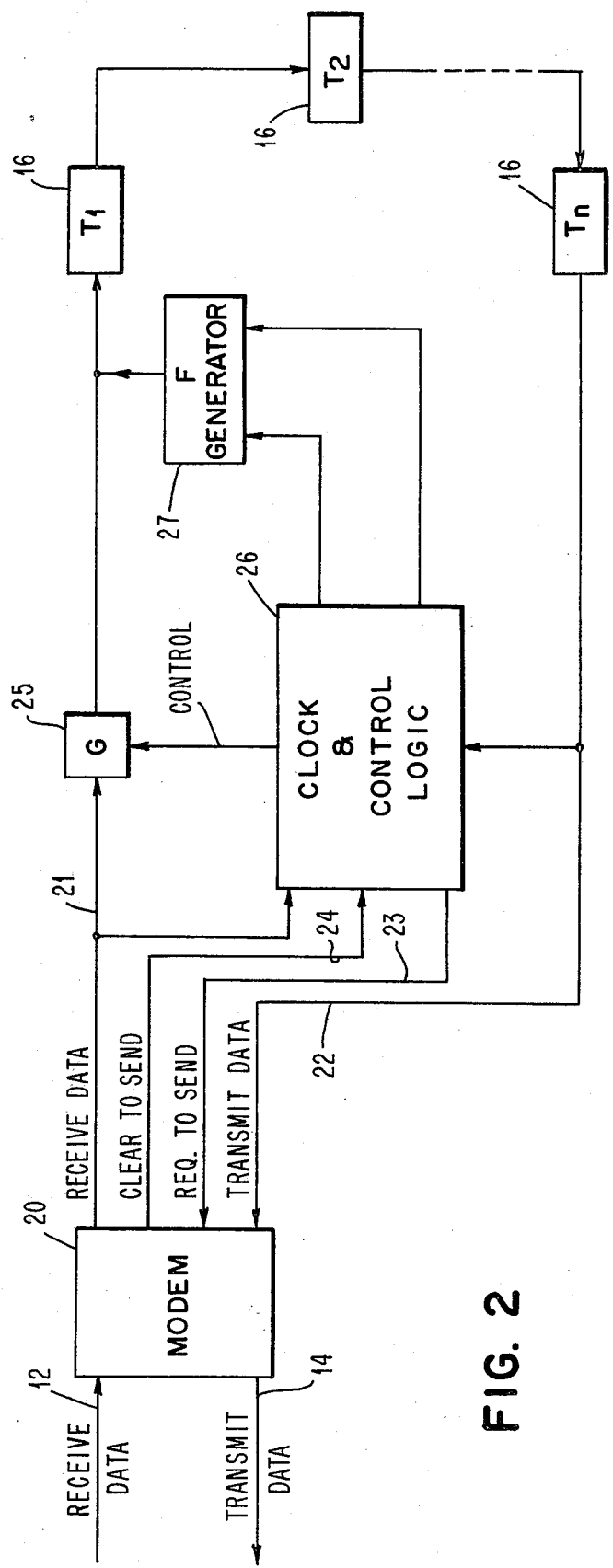
FIG. 2 is a functional block diagram of a single remote loop controller shown in FIG. 1.

FIG. 2 illustrates in greater detail a single remote loop controller 15. The unit 15 is connected to the two wire simplex channels 12 and 14 by a conventional modem 20 which may be, as previously specified, an IBM 3872 Modem or equivalent. This unit will demodulate the signals received on channel 12 and provide the demodulated signals on a line 21. Before transmitting data supplied via line 22, the unit requires a request to send signal via a line 23 and provides some time after receipt thereof a clear to send signal on a line 24. The modem may provide additional control signals; however, they need not be further considered since they are not required in the embodiment illustrated.

The demodulated received data on line 21 is applied to a gate circuit 25 and a clock and control logic 26. The received data will typically include information signals for one or more of the terminals 16 and control signals for the unit 15 and one or more of the terminals 16. Gate circuit 25 will normally pass the received data on line 21 to the first terminal T₁ of the series connected terminals 16. The received data will propagate from terminal to terminal and will not pass the modem 20 which in this mode of operation receives data only.

When the central station 10 desires to receive information data signals from the remote terminals 16 at a given remote loop, it directs a first control signal to the selected remote loop controller 15. This signal is received and decoded by the circuit 26 which signals the modem 20 via the request to send line 23 that modem 20 must prepare to transmit data. When the modem 20 is ready, it returns a clear to send signal on line 24. In the meantime, the central station 10 sends a second control signal which is treated differently by the remote loop controllers 15. The selected remote loop controller 15 must pass this second control signal on to its loop connected terminals while the remaining units 15 must block this signal from their connected terminals 16. The second control signal is preceded by a general or broadcast address, and these non-selected units 15 upon receiving the broadcast address which is decoded in central logic 26 close gate 25 and energize a frame generator 27 for a fixed predetermined time. By doing this, the second control signal does not pass gate 25 of the non-selected units 15 since it follows the broadcast address. The terminals connected thereto, however, receive frame signals which are synchronized with the signals from the central control station 10 and thereby retain synchronism. The signals from frame generator 27 do nothing but maintain synchronism for the terminals 16 which do not now receive signals via gate 25.

The single selected unti 15 passes the second control signal onto the loop connected terminals 16 which require same to initiate transmission at some later time. However, the following go-ahead signals provided by the central station 10 must be blocked until the modem 20 at the selected unit 15 is ready to transmit, otherwise signals from one or possibly more of the terminals 16 will not be transmitted back to the central station 10. Thus, the selected unit 15, after receipt of the second control signal decoded by control logic 26, closes gate 25 and turns on frame generator 27 to interrupt the go-ahead signals provided by the central station 10 until the clear to send signal is provided by the modem 20. When the clear to send signal is received by control logic 26, the gate 25 is opened and frame generator 27 turned off. At this time the go-ahead signals from central station 10 pass on to the terminals 16 and they transmit in sequence if they have data to transmit. The terminals 16 may be designed to operate exactly as shown in U.S. Patent 3,752,932, in which case the second control signal enables the terminals and an uninterrupted string of n "one" bits on the receive lens authorizes transmission of data and constitutes the go-ahead signal described above.

The table below illustrates the event described above by showing the signals supplied by the central station 10 and those provided to the remote terminals 16 by the selected remote loop controller 15 and the non-selected remote loop controllers.

TABLE

| Central 10 | $FA_iC_1BBFA_nC_2BBF1111111$ |
|---|---|
| Selected Remote | $FA_iC_1BBFA_BC_2BB\underline{FF}$--111 |
| Non-selected Remotes | $FA_iC_1BBFA_B\underline{FFFFFF}1111$ |

In the above table:
  F = an $n$ bit character such as 01111110 which will not occur in data and serves to mark or delimit message and acts as an intermessage fill character;
  A = a station address subscript, $i$ being the $i^{th}$ station and B a broadcast address received by all stations;
  $C_1$ = a first unique control character;
  $C_2$ = a second unique control character; and
  B = a checking character used for checking the accuracy of data transmission as is well known in the data transmission art.

The control logic circuit 26 monitors the signals from the last ($T_n$) terminal 16 and when it detects the go-ahead signal, it causes the request to send signal on line 23 to go down. The modem 20, at this time, drops clear to send and stops transmitting the signals on line 22. The central station 10 also detects the go-ahead signal and knows that all of the terminals 16 on the selected remote loop have transmitted and that no more signals will be received. It may now send messages to specific remote terminals 16 or it may start another remote loop transmitting.

Figure 3:
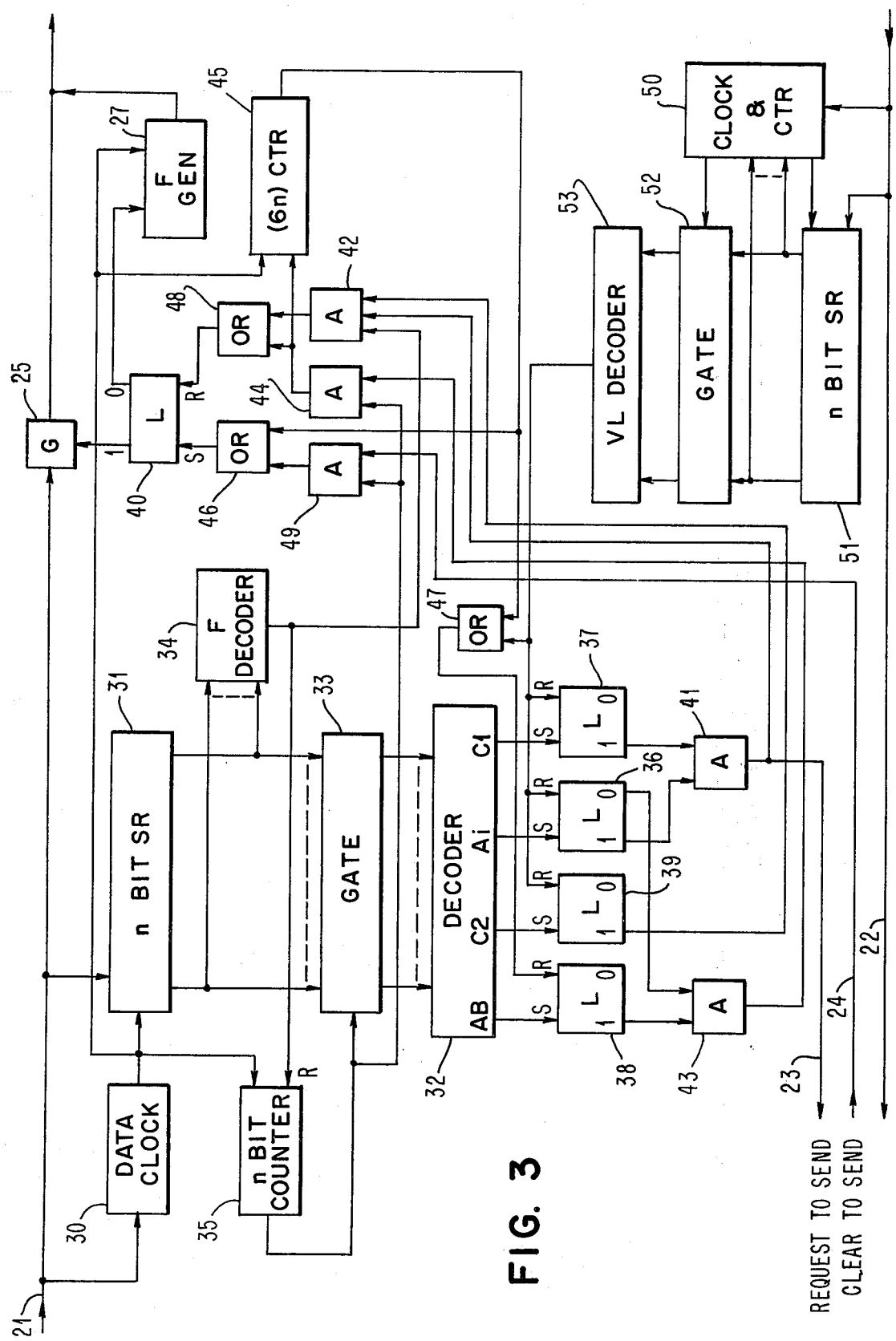
FIG. 3 is a detailed block diagram of the single remote loop controller shown in FIG. 2.

The block diagram of FIG. 3 illustrates in detail how clock and control logic circuit 26 of FIG. 2 accomplishes the functions described above. Gate 25 and frame generator 27 are also illustrated since they are both controlled by the generated control signals.

The data signals on line 21 are applied to a circuit 30 which provides a clock signal based on the signals received. Alternatively, the receive clock signals from the modem 20 may be utilized if the modem used provides the same. The clock signals are used to shift the data signals into an $n$ bit serial shift register 31. Typically, $n$ will equal the number of bits in a message character and may be eight for example. The signals on lines 21 are, as described above, applied to the input of gate 25 which is under control of the control logic circuit 26. When the gate 25 is open or properly energized, the signals on line 21 are passed on to the connected terminals 16.

The n bits resident in register 31 represent the last n received and are modified as each new bit is received. The contents of register 31 are applied in parallel to a first decoder circuit 32 via a multiple position gate circuit 33 and directly to a second decoder 34. The clock signals from circuit 30 are applied to the input of an n bit counter 35 which has a reset input connected to the output of decoder 34 which signals the detection of a frame character. Thus, the output of counter 35 coincides with the character boundaries of the received data and the contents of the shift register 31 are applied via gate 33 to decoder 32 only on character boundaries, e.g., every n bit times.

The decoder 32 provides outputs for setting a latch 36 when it decodes its own address $A_i$, a latch 37 when it decodes the $C_1$ command, a latch 38 when it decodes the broadcast address $A_B$ and a latch 39 when it decodes the $C_2$ command. Another latch 40 when set holds gate 25 open to pass signals from line 21 to the terminals 16. This latch is constructed to assume the set condition when power is turned on. Thereafter it is under control of the signals described below.

The "one" outputs of latches 36 and 37 are applied to an AND circuit 41 which provides the request to send signal on line 23 when latches 36 and 37 are simultaneously in set state. The output from AND circuit 41 is also applied to one input of a three input AND circuit 42. The "one" output of latch 39 is connected to the second input of AND circuit 42 and third input is connected to decoder 34 which acts as a strobe signal occuring on frame and character boundaries.

The "one" output of latch 38 and the "zero" output of latch 36 are applied to the two inputs of an AND circuit which provides an output when latch 38 is set and latch 36 is reset at the same time. This output is applied to a two input AND circuit 44 which has its other input connected to counter 35 which acts as a strobe assuring that the output of AND circuit 44 will occur on a character boundary only. The output from AND circuit 44 is applied to a counter 45 which is arranged to count (6 $n$) clock pulses and provide an output. This output is applied to the set input of latch 40 via an OR circuit 46 and to the reset input of latch 38 by an OR circuit 47. The outputs of AND circuits 42 and 44 are applied to the reset input of latch 40 by an OR circuit 48. The clear to send signal on line 24 from modem 20 is applied to one input of a two input AND circuit 49. The other input is connected to the output of counter 35 and provides the same function as described above. The output of AND circuit 49 is applied to the set input of latch 40 via OR circuit 46.

In operation, the selected remote loop controller operates differently than the non-selected one. It decodes its address $A_i$ and sets latch 36. Upon detection of $C_1$ latch 37 is set and the request to send line activates. At this time one input of circuit 42 is enabled. When the following $C_2$ command is detected, latch 39 is set and the second input of circuit 42 is enabled. When the next following frame is detected by decoder 34, AND circuit 42 provides an output which resets latch 40. This closes gate 25 and starts the frame generator 27. Thus, the go-ahead signal from central station 10 cannot propagate to the terminals 16. When the clear to send signal is received from the modem 20, AND circuit 49 provides an output on the next character boundary which sets latch 40, turning frame generator 37 off and opening gate 25, passing the go-ahead on to terminals 16 which can now transmit since modem 20 will now operate to pass the signals on to station 10 via the channel 14.

In the meantime the non-selected remote loop controllers 15 receive and decode the broadcast address $A_B$ which sets latch 38. Latch 38 being set and latch 36 reset since the controllers were not selected causes an output from AND 43 to turn on counter 45 and reset latch 40 on the next character boundary. This action closes gate 25 and turns on the frame generator 27 for ($6n$) clock periods. The period terminates when counter 45 reaches the preset count. Counter 45 at this time provides an output which sets latch 40, thus simultaneously opening gate 25 and turning frame generator 27 off. In addition, the output of counter 45 resets latch 38 via OR circuit 47 to prepare it for another cycle of operation.

Operation at the selected remote controller 15 is terminated when the last terminal 16 has sent a message. This condition is detected by detecting the go-ahead signal provided by the central station 10 at the output of the last ($T_n$) terminal 16. A clock frame decoder and n bit counter 50 which may be identical to circuits 30, 34 and 35 is connected to receive the output of terminal $T_n$ and the output from an n bit serial shift register 51 which has its serial input connected to receive output from terminal $T_n$. On the character boundaries the contents of register 51 are applied in parallel by a gate 52 to a decoder 53 which looks for a go-ahead signal from central station 10. When this is detected, it indicates that all terminals T having data have completed transmission. At this time output of decoder 53 resets latches 36–39. When the latches are reset, the request to send signal is removed and the remote loop is through transmitting. The output of decoder 53 has no effect on non-selected units 15 since the latches will be reset or need to be reset.

While the invention has been particularly shown and described with reference to preferred embodiments thereof, it will be understood by those skilled in the art that various changes in form and details may be made therein without departing from the spirit and scope of the invention.

What is claimed is:

1. A communications network for providing half-duplex data communication between a central control station and a plurality of groups of remote terminal stations comprising:
   a first simplex communication channel connected to said central station for receiving and conveying signals therefrom;
   a second simplex communication connected to said central station for conveying signals thereto;
   a plurality of remote control units, one for each of said groups connected in parallel to said first and second simplex communications channels and to a plurality of serially connected terminals and comprising;
   first means for receiving signals from said first simplex communication channel and selectively transmitting signals from said series connected terminals to said second simplex communication channel,
   second means for detecting a first control signal directed to a single selected control unit and responsive thereto for causing said first means to transmit signals from said terminals,
   third means responsive to the received signals from the central station for detecting a general address recognizable by all devices connected to said network,
   fourth means responsive to the received signals from the central station for detecting a second control signal,
   fifth means responsive to said second and fourth means when a remote control unit is selected for interrupting the signal path between said first means and the series connected terminals and transmitting predetermined signals to said terminals during a first predetermined period of time, and
   sixth means responsive to said third means when a remote control unit is not selected for interrupting the signal path between the first means and the series connected terminals and transmitting said predetermined signals to said series connected terminals during a second predetermined period of time.

2. A communications network as set forth in claim 1 in which seventh means responsive to the signals received from the series connected terminals detects the completion of transmission and provides a signal indicating that condition to the said second means which causes said first means to cease transmitting signals from said series connected terminals to said second simplex communications channel.

3. A communications network as set forth in claim 2 in which said second control signal is followed by further signals which permit said terminals to transmit and said first predetermined period begins after the receipt of said second control signal and prior to the receipt of said further signals and terminates when said first means is ready to transmit signals received from said series connected terminals.

4. A communications network as set forth in claim 2 in which said general address is followed by said second control signal and said second predetermined period begins after said general address is received and before said second control signal is received and terminates when the message including the said second control signal has been received.

5. A communications network as set forth in claim 3 in which means are provided for examining the input signals for detecting bit and character synchronization and controlling the beginning and termination of the said first and second periods on a character boundary.

6. A communications network as set forth in claim 4 in which means are provided for examining the input signals for detecting bit and character synchronization and controlling the beginning and termination of the said first and second periods on a character boundary.

* * * * *